US012579389B2

(12) United States Patent
Mueller

(10) Patent No.: US 12,579,389 B2
(45) Date of Patent: Mar. 17, 2026

(54) STRUCTURE AND METHODS FOR MOBILE ENROLMENT OF BIOMETRICALLY-AUTHORISABLE SMARTCARDS

(71) Applicant: SMART PACKAGING SOLUTIONS, Rousset (FR)

(72) Inventor: Robert Mueller, Riemerling (DE)

(73) Assignee: SMART PACKAGING SOLUTIONS, Rousset (FR)

( * ) Notice: Subject to any disclaimer, the term of this patent is extended or adjusted under 35 U.S.C. 154(b) by 0 days.

(21) Appl. No.: 18/568,092

(22) PCT Filed: Jun. 23, 2022

(86) PCT No.: PCT/EP2022/067268
§ 371 (c)(1),
(2) Date: Dec. 7, 2023

(87) PCT Pub. No.: WO2022/269000
PCT Pub. Date: Dec. 29, 2022

(65) Prior Publication Data
US 2024/0289567 A1 Aug. 29, 2024

(30) Foreign Application Priority Data

Jun. 24, 2021 (GB) ...................................... 2109119

(51) Int. Cl.
*G06K 7/10* (2006.01)
*G06F 21/32* (2013.01)
(Continued)

(52) U.S. Cl.
CPC ......... *G06K 7/10297* (2013.01); *G06F 21/32* (2013.01); *G06F 21/34* (2013.01); *G06K 19/0709* (2013.01)

(58) Field of Classification Search
CPC ........... G06K 7/10297; G06K 19/0709; G06K 7/10158; G06K 19/0718; G06K 19/0723;
(Continued)

(56) References Cited

U.S. PATENT DOCUMENTS

| | | | | |
|---|---|---|---|---|
| 8,702,006 | B2 * | 4/2014 | Laknin | G06K 19/07735 235/492 |
| 2011/0240825 | A1 * | 10/2011 | Bosquet | G06K 19/077 248/548 |

(Continued)

FOREIGN PATENT DOCUMENTS

| | | | | |
|---|---|---|---|---|
| CA | 3131449 | A1 * | 10/2020 | G06K 7/015 |
| CN | 106599745 | A | 4/2017 | |

(Continued)

OTHER PUBLICATIONS

CN10915144B—NFC card swiping control method, terminal device and storage medium, 18 pages. (Year: 2024).*
(Continued)

*Primary Examiner* — Tuyen K Vo
(74) *Attorney, Agent, or Firm* — Eversheds Sutherland (US) LLP

(57) ABSTRACT

A structure for aligning a biometrically-authorisable smartcard with respect to a smartphone during biometric enrolment of the smartcard. The structure includes a smartcard area for receiving the smartcard and a guide for aligning the structure in a predetermined position with respect to the smartphone. The alignment structure is configured such that, when the smartcard is received in the smartcard area and the structure is aligned in the predetermined position with respect to the smartphone, the smartcard is located proximate a near field communication antenna of the smartphone such that the smartcard receives power from the antenna.

25 Claims, 4 Drawing Sheets

(51) Int. Cl.
    *G06F 21/34*       (2013.01)
    *G06K 19/07*       (2006.01)
(58) Field of Classification Search
    CPC ......... G06K 7/015; G06F 21/32; G06F 21/34;
                                 G06V 40/10; G06V 40/1318
    See application file for complete search history.

(56)                      References Cited

U.S. PATENT DOCUMENTS

| | | |
|---|---|---|
| 2018/0276519 A1* | 9/2018 | Benkley, III ....... G06V 40/1306 |
| 2020/0311509 A1* | 10/2020 | Benkley, III ............ G06F 21/32 |
| 2020/0327533 A1 | 10/2020 | Deprun et al. |
| 2021/0120193 A1* | 4/2021 | Swager .................. G06V 10/00 |
| 2024/0187408 A1* | 6/2024 | Köhn et al. ......... H04L 63/0853 |

FOREIGN PATENT DOCUMENTS

| | | | |
|---|---|---|---|
| CN | 110915144 B | * 12/2021 | |
| EP | 3 598 328 A1 | 1/2020 | |
| EP | 3 625 729 B1 | 6/2020 | |
| WO | WO-2020002678 A1 * | 1/2020 | ............. A61B 5/117 |

OTHER PUBLICATIONS

CN203168270U—double-face automatic built-in strongly magnetic core two sides through the transparent card sleeve, 3 pages. (Year: 2024).*
International Search Report and Written Opinion, PCT/EP2022/067268, dated Oct. 12, 2022 (14 pp.).
Search Report, GB2109119.4, dated Nov. 24, 2021 (3 pp.).

\* cited by examiner

STRUCTURE AND METHODS FOR MOBILE ENROLMENT OF BIOMETRICALLY-AUTHORISABLE SMARTCARDS

TECHNICAL FIELD

The present invention relates to a structure for aligning a biometrically-authorisable smartcard with respect to a smartphone during biometric enrolment of the smartcard, as well as a corresponding enrolment system and a number of methods.

BACKGROUND OF THE INVENTION

Biometrically authorisable devices such as smartcards are becoming increasingly more widely used and include, for example access cards, credit cards, debit cards, pre-pay cards, loyalty cards, identity cards, and so on. Smartcards are electronic cards with the ability to store data and to interact with the user and/or with outside devices, for example via contactless technologies such as near field communication (NFC). These smartcards can interact with readers to communicate information in order to enable access, to authorise transactions and so on.

Biometric authorisation such as fingerprint authorisation is becoming increasingly more widely used. Smartcards with complete on-board biometric authorisation are called Biometric System-on-Card (BSoC) and can interact with the user via integrated biometric capture devices (such as fingerprint sensors) in order to enable access to secure features of the smartcard, for example in order to authorise financial transactions.

Biometrically-authorisable smartcards require completion of an enrolment process (e.g. the capturing and registration of a user's fingerprint) before they can be used. It is desirable to use the biometric capture device integrated in the smartcard during enrolment. This avoids the need for potentially insecure transmission of the biometric data over a network, and instead the biometric data can be securely kept in the smartcard with no requirement for external storage or transmission. It also increases the accuracy of the biometric identification process since the exact same capture device is used for enrolment as is used for later authentication by checking the user's currently captured biometric data against previously stored biometric reference data. Such a process requires that the smartcard be powered.

For smartcards with no on-board power source, power is sometimes supplied to the card for use during the enrolment process via a passive enrolment device/sleeve with an internal battery that is arranged to provide power to the smartcard via an electrical connection, such as disclosed in WO 2020/002678 A1. Alternatively, power is sometimes supplied to the smartcard via a wired connection to an external power source, such as power drawn via a connection with an ISO/IEC 7816 contact plate of the smartcard or with a dedicated interfacing device connecting in a contactless manner, e.g. using an ISO/IEC 14443-3 interface. However, there are technical constraints from the external power source in relation to the current drawn via this approach as well as difficulties in handling a large power at the smartcard itself.

SUMMARY OF THE INVENTION

According to a first aspect the present invention provides a structure for aligning a biometrically-authorisable smartcard with respect to a smartphone during biometric enrolment of the smartcard, the structure comprising: a smartcard area for receiving the smartcard; and a guide for aligning the structure in a predetermined position with respect to the smartphone, wherein the alignment structure is configured such that, when the smartcard is received in the smartcard area and the structure is aligned in the predetermined position with respect to the smartphone, the smartcard is located proximate a near field communication antenna of the smartphone such that the smartcard receives power from the antenna.

Because it does not require any additional hardware, it is advantageous to use a smartphone (e.g. belonging the cardholder) to supply power to the smartcard via a near-field communication (NFC) antenna during enrolment. In this way, a wireless connection is utilised, with power being harvested using an antenna of the smartcard via a contactless coupling with the NFC antenna of the smartphone. Many modern smartphones comprise a suitable NFC antenna for this purpose.

Mobile enrolment also enables the performing of enrolment flexibly by the user at home or on the go. However, one challenge with of the use of a smartphone for mobile enrolment is that the NFC field from many smartphones is only sufficient to power the smartcard for enrolment in certain positions and it is difficult for users to identify and hold the smartcard stable in a suitable position beside the phone.

These difficulties can result in a low success rate of mobile enrolment, which can result in mobile enrolment being frustrating and time consuming for users.

The structure according to at least some embodiments of the present invention aids a user during the enrolment process to guide the positioning of the smartcard during enrollment allowing:

sufficient, stable energy supply to the card during enrolment;

stable communication; and good ergonomics for presenting biometric features.

The structure can be manufactured, shipped and disposed of at low cost. It improves the user experience and success rate for mobile enrollments of biometric cards significantly. The structure may avoid shipping a sleeve or similar single use device with related extra cost and environmental footprint.

The structure may be configured such that the predetermined position ensures optimal, stable power is provided to the smartcard from the antenna of the smartphone. The predetermined position may not necessarily provide the maximum overlap between the smartcard (or an antenna of the smartcard) and the antenna of the smartphone, but may be determined to provide the best energy transfer and communication stability between the smartphone and the smartcard.

When discussing the "optimal" power and "best" energy transfer, it will be appreciated that this should be interpreted as the optimal power/energy within certain constraints of biometric enrolment of the smartcard. For example, the position may be limited in that the smartcard and structure must be flat against the phone surface for the user to perform the alignment.

The smartcard area may be defined by a cut-out in the structure, and the cut-out may be configured to hold the smartcard in place, for example mechanically. The smartcard may be held at part of its periphery by an edge of the structure at the cut-out. The smartcard may be held in a friction fit. Alternatively, or additionally, the smartcard may be held in place by a tab or cover over the smartcard area. In other embodiments, the smartcard area may comprise an adhesive to hold the smartcard in place.

Part or all of the smartcard may be positioned in the smartcard area. For example, the smartcard area may be configured such that a smartcard received in the smartcard area extends beyond an edge of the structure and/or the smartphone.

The smartcard area may have a back on which the smartcard may be configured to rest.

The structure may comprise a folded structure. The folded structure may be held in the folded position with an adhesive. The adhesive may comprise adhesive dots, such as glue dots. Where the structure comprises a folded structure, the smartcard may be held in place by the folded structure. For example, the structure may be configured such that the smartcard is receivable in the smartcard area prior to the structure being folded, such that when the structure is folded the smartcard is held between two portions of the folded structure.

The smartcard area may comprise a ferromagnetic or magnetically permeable or reflecting element. The element may be configured to improve near field communication in its proximity and, in particular, to improve near field communication between a smartcard positioned in the smartcard area and a smartphone with which the structure is aligned.

The element may comprise a ferrite and/or Mu-metal material. A ferrite is a ceramic material made by mixing and firing large proportions of iron(III) oxide ($Fe^2O^3$, rust) blended with small proportions of one or more additional metallic elements, such as strontium, barium, manganese, nickel, and zinc. It is ferromagnetic, meaning it can be magnetized or attracted to a magnet. A Mu-metal material is a nickel-iron soft ferromagnetic alloy with very high permeability. Mu-metal typically has relative permeability values of 80,000-100,000.

The element may be in the form of a coating, such as a layer of foil. This coating may be present on part or all of the smartcard area.

The guide may comprise an edge of the structure and/or one or more alignment marks, wherein the edge of the structure and/or one or more alignment marks are configured for aligning the structure with edge(s) of the smartphone. For example, during enrolment the user may align two adjacent edges of the structure with two edges of the smartphone. Alternatively, or additionally, the user may align alignment marks with a particular edge or edges of the smartphone. Alignment marks may comprise visual indicators such as arrows and/or text, for example instructing a user to align a particular edge of the structure with the smartphone.

The structure may be formed from a paper-based material, such as cardboard, card stock, paperboard, paper, or the like. This makes it cheap to produce and easy to recycle.

The structure may comprise a first guide for (i.e. for use in an enrolment method with) a first smartphone model or family of smartphone models, and a second guide for a second smartphone model or family of smartphone models. In this way a single structure may be suitable for a range of smartphone models. The structure may comprise any number of guides for use with any number of smartphone models.

The structure may be configured to allow a selection of which of the guides is exposed for use by removing part of the structure. For example, the two (or any number of) guides may come as part of a single structure, with one guide on a portion of the structure surrounding another guide.

Perforations may present in the structure for removing the surrounding portion of the structure to expose the inner guide. Alternatively, a single structure may comprise a plurality of guides usable without modification to the structure.

The alignment structure may configured such that, when the smartcard is received in the smartcard area, the smartphone can communicate with the smartcard via the antenna.

According to a second aspect, the present invention provides a system for biometric enrolment of a biometrically-authorisable smartcard, the system comprising: a structure according to the first aspect (including any of the optional features described herein); a biometrically-authorisable smartcard; and a smartphone, wherein the smartcard does not comprise a power source.

The smartcard may have a size in accordance with an ID-1 card (following ISO/IEC 7810). In particular, the smartcard may have a size of 85.60 mm (+0.12 mm/−0.13 mm) by 53.98 mm (+0.05 mm/−0.06 mm) and rounded corners with a radius of 2.88-3.48 mm, and a thickness of 0.76 (+0.08 mm/−0.08 mm). The smartcard may more generally have a size of approximately 86 by 54 millimetres.

The smartcard may comprise a NFC antenna for receiving power and/or communicating with from the smartphone.

The smartcard may comprise an antenna and may be configured to communicate via a wireless/contactless communication protocol, such as e.g. ISO/IEC 14443-3. The smartcard may be configured to communicate with the smartphone via such protocol. The smartcard may comprise a smartcard chip.

The smartcard may comprise an onboard biometric capture device, which may be a fingerprint sensor. Enrolment of the smartcard may be performed using the biometric capture device of the smartcard, and the smartcard may be biometrically-authorisable with the biometric capture device.

In addition to supplying power to the smartcard via NFC, the smartphone may also send commands to the smartcard for enrolment and/or receive data from the smartcard and/or guide the user with feedback via its built-in display.

According to a third aspect, the present invention provides a method of enrolling a biometrically-authorisable smartcard, the method comprising: placing a smartcard in the smartcard area of a structure according to the first aspect (including any of the optional features described herein); aligning the structure with a smartphone using the guide; and supplying power from the smartphone to the smartcard via a near field communication antenna of the smartphone.

The smartcard and structure may be placed above or below the smartphone, which may depend on the location of the NFC antennae of the smartphone. For example, if the NFC antennae of the smartphone is located proximate the rear side of the phone, the smartcard and structure may be placed below the smartphone, in order to be nearer the NFC antennae to improve signal strength. This aids in the supply of optimal, stable power to the smartcard during enrolment. As mentioned above, when discussing the "optimal" energy, it will be appreciated that this should be interpreted as the optimal energy within certain constraints of the enrolment method. For example, the position may be limited in that the smartcard and structure must be flat against the phone surface for the user to perform the alignment, and/or that the biometric capture device of the smartcard must be accessible and/or that the smartcard may be roughly be aligned with the orientation of the smartphone or an edge of the smartphone.

The method may comprise instructing a user via on-screen instructions on the smartphone how to align the guide of the structure with respect to the smartphone. The method may comprise instructing a user via on-screen instructions on the smartphone to adjust the alignment of the structure with respect to the smartphone. This fine-tuning may help to improve the supply of power from the smartphone to the smartcard.

The method may comprise determining a signal strength of near-field communication between the smartphone and the smartcard and instructing the user to adjust the alignment based on the determined signal strength. The signal strength may be determined by measurement from the smartphone. The determining of signal strength and the adjustment may be performed in real-time and/or may be iterative. The user may be instructed via instructions displayed on the screen of the smartphone.

The method may comprise: a user presenting a biometric identifier, such as a fingerprint, to a biometric capture device of the smartcard; capturing biometric probe data using the biometric capture device of the smartcard; generating biometric reference data from the biometric probe data and storing the biometric reference data on the smartcard. The biometric capture device may be a fingerprint sensor, the biometric probe data may be a fingerprint image and the biometric reference data may be fingerprint reference data based on the fingerprint image.

The method may comprise presenting enrolment instructions to the user. Enrolment instructions may be presented on the screen of the smartphone and/or on the structure itself. For example, the instructions may be printed on a surface of the structure.

The aligning of the structure with respect to the smartphone may be performed by aligning an edge of the structure with respect to an edge of the smartphone.

The method may comprise: aligning the structure with respect to a smartphone; capturing a first biometric identifier of a user (e.g. their right thumb); changing an orientation of one or more of: the phone, the structure and the smartcard; re-aligning the structure with respect to the smartphone; and capturing a second biometric identifier of the user (e.g. their left thumb). The first and second biometric identifiers may be indicated to the user by the smartphone (e.g. "please place your right thumb onto the sensor of the card"). The re-aligning of the structure with respect to the smartphone may be performed with a second guide of the structure. For example, the re-aligning may be performed by aligning a second, different guide of the structure with the same or a different edge (or edges) of the smartphone. Alternatively, the re-aligning may be performed by aligning the first guide of the structure with a different edge (or edges) of the smartphone. This changing of orientation and re-alignment can make it easier to capture fingerprint images of different fingers (in particular fingers of different hands).

According to a fourth aspect, the present invention provides a method comprising: identifying a smartphone to be used for providing power to a biometrically-authorisable smartcard during enrolment; identifying a position for the smartcard with respect to smartphone in which the smartcard is located proximate a near field communication antenna of the smartphone such that the smartcard can receive power from the antenna, creating a design of a structure having a guide for aligning the structure with respect to the smartphone, and a smartcard area for receiving the smartcard, wherein the smartcard area and guide are designed such that, when the smartcard is received by the smartcard area and the structure is aligned with respect to the smartphone in accordance with the guide, the smartcard is located in the identified position relative to the smartphone.

The structure may be a structure in accordance with the first aspect, including any of the optional features described herein.

The identifying of a position for the smartcard may comprise identifying a position for substantially optimal near field communication between the smartcard and the smartphone. As previously discussed, optimal near field communication should be interpreted as the optimal energy within certain constraints of the enrolment method. For example, the position may be limited in that the smartcard and structure must be flat against the phone surface for the user to perform the alignment, and/or that the biometric capture device of the smartcard must be accessible and/or that the smartcard may be roughly aligned with an orientation of the phone or an edge of the phone. Optimal near field communication may comprise a minimum threshold of power to be supplied from the smartphone to the smartcard during enrolment.

The determined position of the smartcard may be a position for substantially optimal near field communication, or within 1 cm or 0.5 cm of such a position.

The predetermined position of the structure with respect to the smartphone in the first aspect may be similar defined as the position for substantially optimal near field communication.

The method may comprise manufacturing a structure having a guide and a smartcard area according to the design.

According to a fifth aspect, the present invention provides a method comprising: identifying a model of a smartphone of a user; selecting a structure for aligning a biometrically-authorisable smartcard with respect to the identified model of smartphone during biometric enrolment of the smartcard, the structure being a structure according to the first aspect (including any of the optional features described herein); and sending the selected structure to the user.

The structure may be sent to the user via a postal service. Therefore, the structure may be configured to be delivered to an end user by a mail delivery service. In particular, the structure may fit within the shape and size of a typical letter. For example, the structure may have dimensions of less than 24 cm×16 cm×5 mm.

The structure may include a compartment for a sleeve which can be left unpopulated if the cardholder indicated possession of a suitable smartphone for mobile enrolment—and willingness to use it for this purpose. This saves the cost for the sleeve hardware and avoids disposal of the same and its battery.

The method may comprise sending the structure to the user along with a biometrically-authorisable smartcard to be enrolled. For delivery purposes, the smartcard may be mounted in the smartcard area.

The method may comprise receiving a request to send a biometrically-authorisable smartcard to a user, the request comprising an indication of a model of a smartphone in the possession of the user. The request may be sent from a user or from their bank or other card provider.

BRIEF DESCRIPTION OF THE DRAWINGS

Certain preferred embodiments of the present invention will now be described in greater detail, by way of example only and with reference to the accompanying drawings, in which.

DETAILED DESCRIPTION

Figure 1:
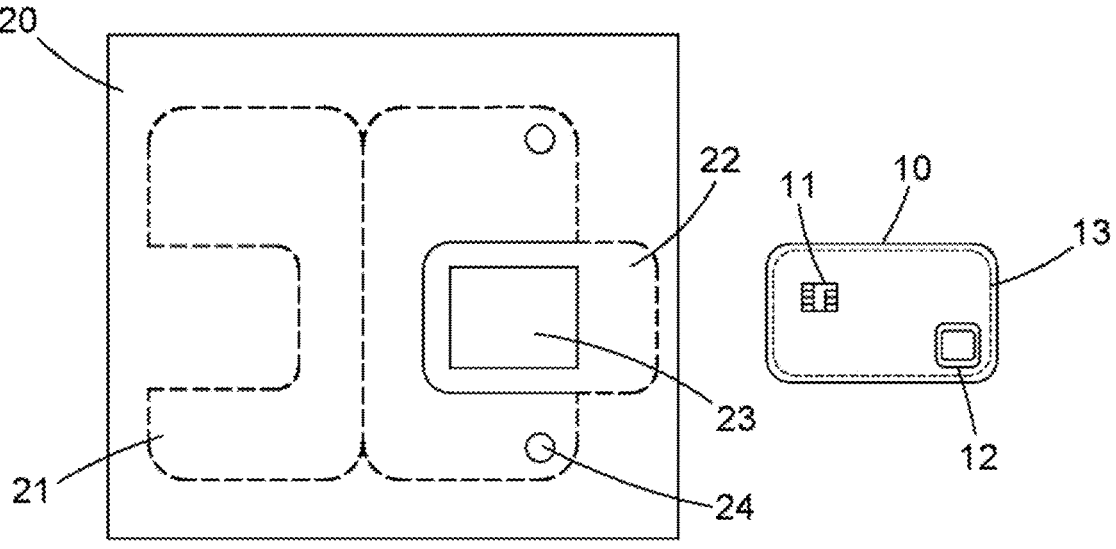
FIG. 1 is a plan view of a structure for aligning a biometrically-authorisable smartcard with respect to a smartphone during biometric enrolment of the smartcard.

FIG. 1 shows a carrier 20 made from card and comprising a structure 21 for aligning a biometrically-authorisable smartcard 10 with respect to a smartphone during biometric enrolment of the smartcard 10. The structure 21 is separable from the carrier 20 by means of perforations in the card at the edges of the structure 21.

The structure 21 comprises a smartcard area 22 for receiving the smartcard 10 and the smartcard area 22 comprises a foil coating 23. The foil coating 23 is made from a ferrite or Mu-metal material and is arranged to improve near field communication (NFC) efficiency in its proximity. In the structure 21 shown in FIG. 1, the smartcard area 22 is large enough to hold the entire smartcard 10, as it extends out to the right of the smartphone (when the structure is aligned therewith).

The structure 21 also comprises glue points 24 for holding the structure 21 in a folded configuration (as described in more detail below, with reference to FIG. 2).

The smartcard 10 has a form factor of an ID-1 card (see ISO/IEC 7810) and therefore has nominal dimensions of 85.60 by 53.98 by 0.76 millimetres (plus or minus allowed tolerances) and rounded corners with a radius of 2.88-3.48 mm.

The smartcard 10 comprises a contact plate 11 (see ISO/IEC 7816-1,-2) and an NFC antenna 13 that is configured to communicate via a contactless protocol, such as ISO/IEC 14443-3.

The smartcard 10 also comprises a biometric capture device in the form of a fingerprint sensor 12 that is configured to be used for capturing of fingerprint data during enrolment of the user onto the smartcard 10 and during subsequent biometric authorisations of the user by the smartcard 10.

Figure 2:
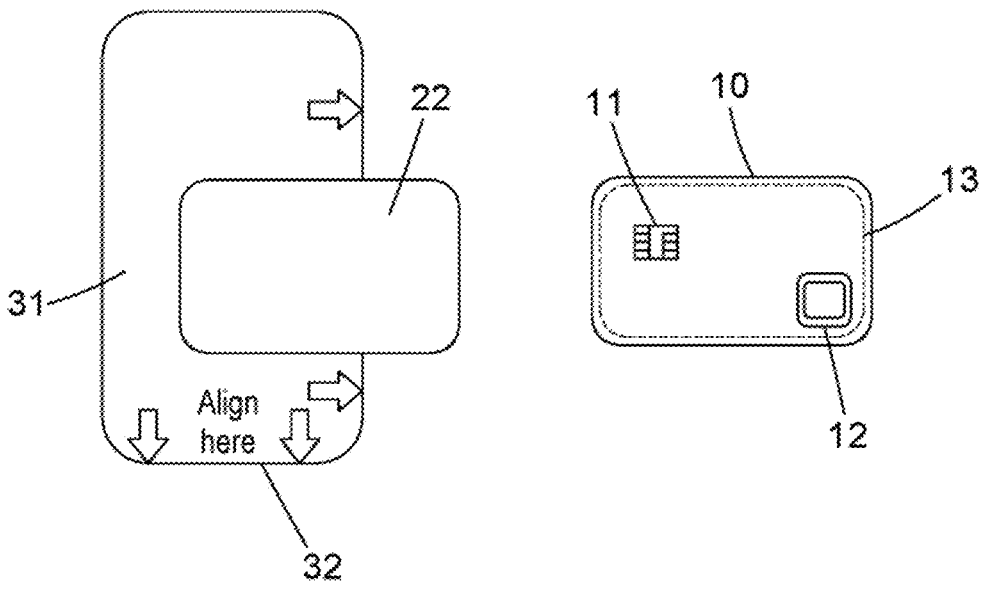
FIG. 2 is a second plan view of the structure shown in FIG. 1, where the structure has been folded.

In use, the structure 21 is folded along a central dashed line to form a structure as shown in FIG. 2. The cut-out shown on the left hand side of the structure 21 in FIG. 1 results in the forming of a smartcard area 22 being partly surrounded by an edge of card (on three sides) when the structure 21 has been folded. This edge helps to hold the smartcard 10 in place in the smartcard area 22 during the enrolment process.

Figure 1A:
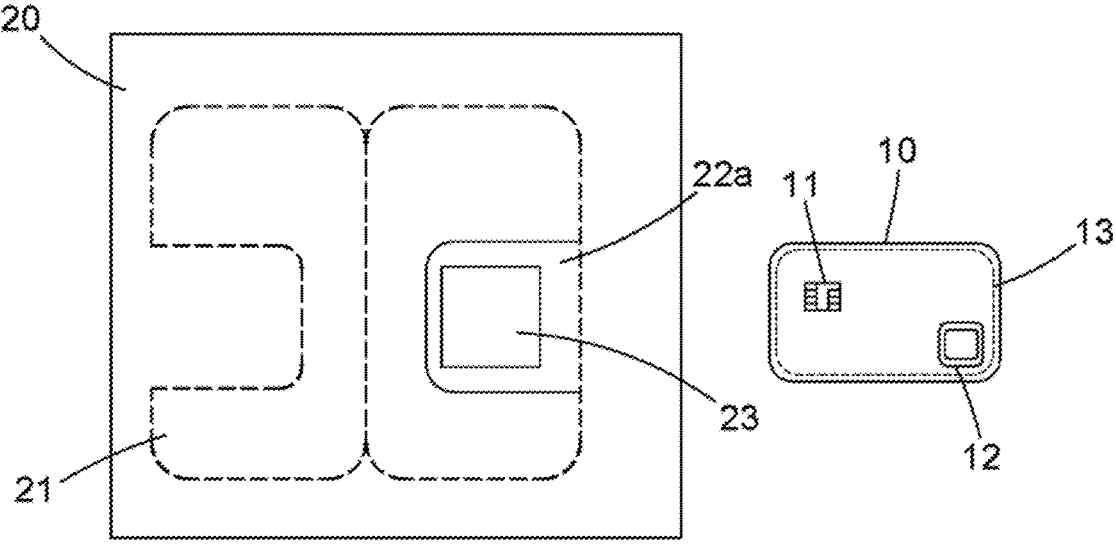
FIG. 1a is a plan view of another structure for aligning a biometrically-authorisable smartcard with respect to a smartphone during biometric enrolment of the smartcard.

FIG. 1a shows an alternative card carrier 20 comprising a structure 21 for aligning a biometrically-authorisable smartcard 10 with respect to a smartphone during biometric enrolment of the smartcard 10. This structure 21 is similar to the structure 21 shown in FIG. 1, with the same reference numerals indicating identical features. However, the structure 21 shown in FIG. 2 has a smartcard area 22a that is configured to hold only part of the smartcard 10, as the smartcard area 22a does not extend to the right hand side of the structure 21. It will be appreciated that such an arrangement can still hold the smartcard 10 securely given that it is still surrounded partly on three edges by an edge of the smartcard 10 when the structure 21 is folded.

FIG. 2 shows a structure 31 (identical to that shown in FIG. 1) after it has been folded for use in an enrolment process. Here, it can be seen that the front of the structure comprises a number of guide indications 32 in the form of arrows and text indicating to a user how to align the structure 31 with a smartphone during enrolment. In the arrangement shown, the structure 31 is to be aligned along its bottom and right hand guide edges with the bottom and right hand guide edges of the smartphone, as indicated by the arrows.

The guides of the structure 31 (i.e. guide indications 32 and guide edges) can take other forms, for example the guide indications 32 could be omitted, such that the guides are simply the guide edges of the structure 31. Alternatively, or additionally, one or more guide windows may be formed in the structure 31, and instructions could be given to a user informing them to align the guide edges and/or guide windows of the structure 31 with specific edges or other features of the smartphone.

Figure 3:
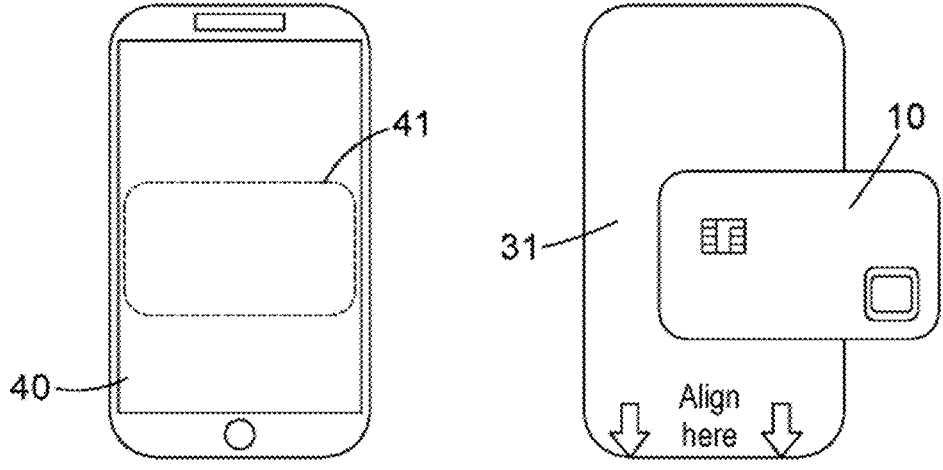
FIG. 3 is a schematic of a system for biometric enrolment of a biometrically-authorisable smartcard.

FIG. 3 shows the structure 31 and smartcard 10 of FIG. 2 as part of a system for biometric enrolment of the smartcard 10. The system comprises a smartphone 40, having a near field communication antenna 41 located towards its rear.

Figure 4:
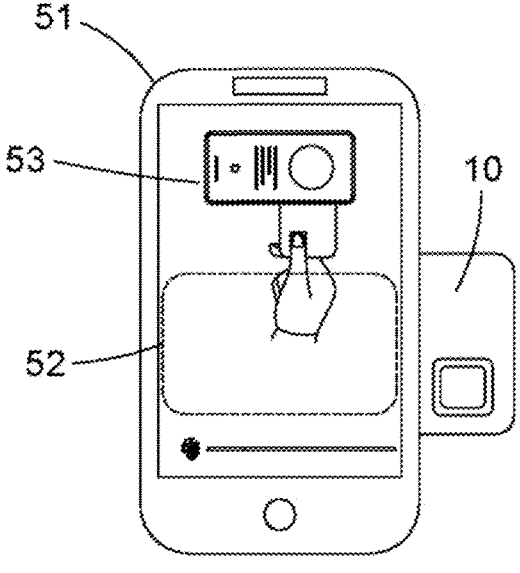
FIG. 4 is a plan view of the system of FIG. 3 during an enrolment process.

With reference to FIG. 4, in use during the enrolment process, the smartcard 10 is positioned in the smartcard area 22 of the structure 31 as previously described. The structure 31 is then positioned behind the smartphone 51, in contact with its rear surface, and aligned with the bottom and right hand edges of the smartphone 51, in accordance with the guides 32.

The smartphone 51 detects the presence of the smartcard 10, and the enrolment process is guided by an application 53 on the smartphone 51. In this aligned position, the smartphone 51 provides power to the smartcard 10 for enrolment via the NFC antenna 52.

The smartphone 51 is configured to detect if the position of smartcard 10 relative to the NFC antenna 52 is sub-optimal, for example if not enough power is being supplied to the smartcard 10 for enrolment. If this is the case, the app 53 guides the user in adjusting the position of the structure 31 and smartcard 10 accordingly. Such guidance is based on a signal strength measurement of power supplied to the smartcard 10 by the smartphone 51 and is dynamic, in real-time.

Once the smartcard 10 is in a position where sufficient, stable power can be supplied for enrolment, the app 53 guides the user through the enrolment process. The enrolment process comprises: a user presenting a finger to a fingerprint sensor 12 of the smartcard 10; capturing one or more fingerprint images using the fingerprint sensor 12 of the smartcard; generating biometric reference data based on the captured fingerprint images in the sensor, MCU or secure element of the smartcard 10 and storing the biometric reference data on the smartcard 10.

Figure 5:
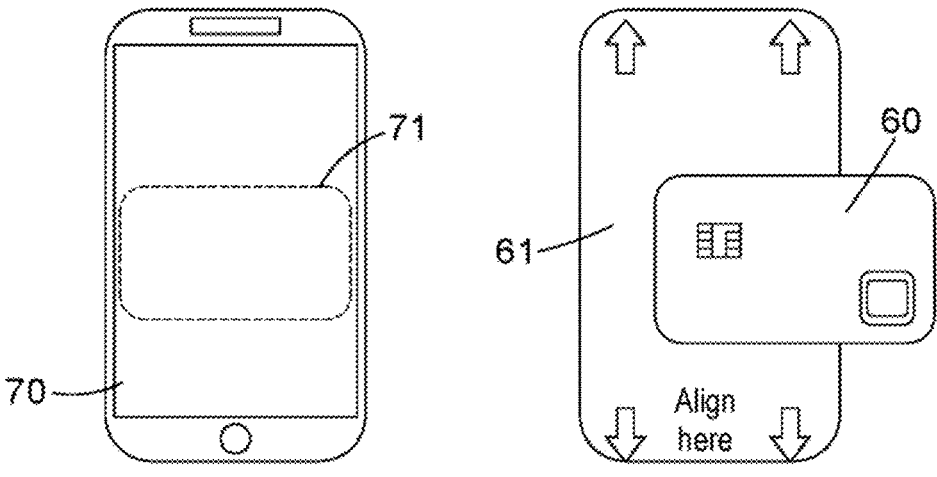
FIG. 5 is a schematic of another system for biometric enrolment of a biometrically-authorisable smartcard.

Another system for enrolment is illustrated in FIG. 5. This system comprises a smartcard 60 and smartphone 70 with an NFC antenna 71, which are the same as those of FIGS. 2 to 4, but utilises a different structure 61 for aligning the smartcard 60 with respect to the smartphone 70 during biometric enrolment of the smartcard 60.

In this system, the structure 61 comprises guides at both the top and bottom of the structure 61, each comprising guide indications and guide edges. The guides at the top of the structure 61 are for enrolling fingerprints when the structure 61 is in a first orientation relative to the smartphone 70, and the guides at the bottom of the structure 61 are for aligning the structure 61 with the smartphone 70 when it is in a second orientation.

The guide indications are arrows and texts indicating the edges that are to be aligned with the smartphone 70. The structure is symmetrical in that the guides at the top and bottom edges of the structure are equidistant from the centre of the structure 61 (and the card 60). Due to this symmetry, the structure can align with an edge of the smartphone either along the top or bottom guide edge of the structure 61, depending on the orientation of the structure 61.

This structure 61 can therefore be used in an enrolment process that comprises alignment with an edge of the smartphone 70 before a first sequence of scans for enrolment, the changing of the orientation of the structure 61 (and hence also the smartcard 60) relative to the smartphone 70, and then re-alignment with the same edge of the smartphone before a second sequence of scans for enrolment. This is described in more detail with reference to FIG. 6.

Figure 6:
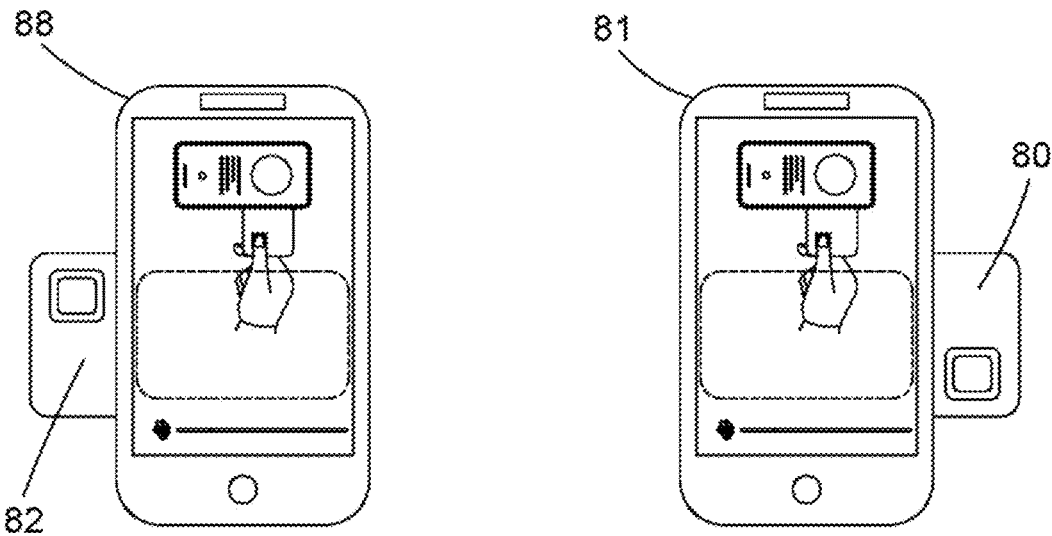
FIG. 6 shows two plan views of the system of FIG. 5 during two different stages of an enrolment process.

FIG. 6 illustrates (on the left side of the figure) how the smartphone 83 and smartcard 82 are positioned for enrolling a first finger with the smartcard 10 extending to the left of the smartphone e.g. to enrol the left thumb on the left hand side. In this set-up the guides on the bottom of the structure 61 (shown in FIG. 5) are aligned with the bottom edge of the smartphone 83. In this set-up the user may hold the smartphone 83 with the aligned structure 61 and smartcard 82 with the right hand while scanning a finger or thumb of the left hand.

The right side of FIG. 6 shows how the smartphone 83 and smartcard 82 can be re-positioned and re-aligned, with the smartcard 80 then extending to the right of the smartphone 81 for enrolling a second finger e.g. the right thumb. In this set-up, the structure 61 and with it the smartcard 80 has been rotated by 180° about an axis perpendicular to the plane of the structure 61, and the guides at the top of the structure in FIG. 5 are aligned with the bottom of the smartphone 81. In this set-up, the user may hold the smartphone 81 with the re-aligned structure 61 and smartcard 80 with the left hand while scanning a finger or thumb of the right hand.

The structures described herein may be provided in different variants for different mobile phones having different dimensions, antenna locations and optimal positions for the smartcard relative to the smartphone.

Figure 7:
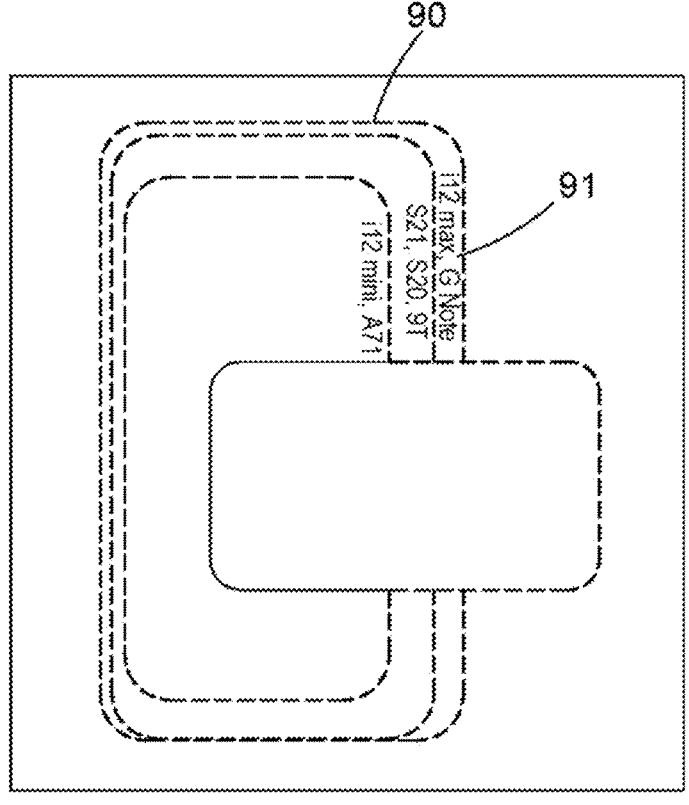
FIG. 7 is a plan view of a carrier comprising a plurality of structures for aligning a biometrically-authorisable smartcard with respect to a smartphone during biometric enrolment of the smartcard.

In order to accommodate multiple models of mobile phones at once, as illustrated in FIG. 7, a single card structure 90 provides a plurality of pre-cut guides, each guide being for a different model or family of phones, and each being marked with a phone model indicator 91 for a group or family of phones accordingly. The structure 90 is provided with perforations between the various guides (along the dashed lines shown in FIG. 7) in order to allow for a selection of a particular guides that is to be exposed for use. This selection is achieved by tearing along the perforations to remove the part of the structure 90 relating to the surrounding guide, or guides, that are not being used.

In order to design and manufacture the structures described herein, the following method may be utilised.

First, a structure designer will identify a particular smartphone that is to be used to provide power to a biometrically-authorisable smartcard during enrolment.

Next, the structure designer will identify a position for the smartcard with respect to smartphone in which the smartcard is located proximate a near field communication antenna of the smartphone such that the smartcard can receive power from the antenna.

The position may be determined in any suitable manner.

In some embodiments, the position may be determined analytically, based on knowledge of the position and configuration of the NFC antenna of the smartphone. For example, the position may be determined simply by determining the position where the smartcard is closest to the NFC antenna.

Alternatively, or additionally, the position may be determined by experimentation. This experimentation may involve testing different possible positions to determine a position which provide sufficient and/or maximum power supply to the smartcard. In a simple implementation, this may involve simply positioning a smartcard in different positions relative to the smartcard to determine where sufficient power is received. In more complex implementations, the smartcard (or a testing tool configured to emulate a smartcard) may provide feedback, either to the smartphone or another testing device to indicate the degree of power received from the smartphone, in order to determine which position provides provide sufficient and/or maximum power supply from the smartphone.

Once a smartcard position has been determined, the structure designer will create a design for a structure. The structure will have a guide for aligning the structure with respect to the smartphone, such as the guide indications and/or guide edges discussed above, as well as a smartcard area for receiving the smartcard. The smartcard area and guide are designed such that, when a smartcard is received by the smartcard area and the structure is aligned with the smartphone in accordance with the guides, the smartcard is located in the identified position relative to the smartphone.

The design may be a folded design as discussed above with reference to FIGS. 1 and 2.

The structure designer may determine suitable positions for a plurality of different models of smartphones. The structure designer may therefore create a design for a structure that comprises a plurality of different guides for different models, such as that shown in FIG. 7.

Once the design has been completed, one or more structures may be manufactured in accordance with the design. Any suitable method of manufacture may be used. For example, the manufacture may comprise a printing process for applying the guide indications to a sheet of card and a punching process, which cuts the guide from the sheet of card and also forms perforations.

A smartcard issuing authority may be provided with a plurality of different structures, which are suitable for use with a plurality of different models of smartphones.

When the smartcard issuing authority receives a request to issue a smartcard to a user, such as from a bank, from the user, or due to an internal workflow, the smartcard issuing authority first identifies a model of a smartphone owned by the user. This may be determined based on the content of the request, may be retrieved from a database, or may be requested either from the user or from the request issuer.

The smartcard issuing authority will then select a suitable structure corresponding to the identified model of smartphone from amongst the plurality of different structures. The selected structure is then sent to the user alongside the smartcard, for example by a postal service. This process may also be handled by a dedicated personalization bureau, fulfilment centre or other entity different from the issuing authority.

In some embodiments, the smartcard may be mounted in the structure before sending to the user. For example, the smartcard may be attached by an adhesive to the smartcard area of the structure.

It should be apparent that the foregoing relates only to the preferred embodiments of the present application and the resultant patent. Numerous changes and modification may be made herein by one of ordinary skill in the art without departing from the general spirit and scope of the invention as defined by the following claims and the equivalents thereof.

The invention claimed is:

1. A structure for aligning a biometrically-authorisable smartcard with respect to a smartphone during biometric enrolment of the smartcard, the structure comprising:
    a smartcard area for receiving the smartcard; and
    a guide for aligning the structure in a predetermined position with respect to the smartphone,
    wherein the alignment structure is configured such that, when the smartcard is received in the smartcard area and the structure is aligned in the predetermined position with respect to the smartphone, the smartcard is located proximate a near field communication antenna of the smartphone such that the smartcard receives power from the antenna for a direct power transfer between the smartphone and the smartcard;
    the structure being passive and re-alignable with respect to the smartphone; and
    the structure being disposable.

2. A structure according to claim 1, wherein the smartcard area is defined by a cut-out in the structure, and the cut-out is configured to hold the smartcard.

3. A structure according to claim 1, wherein the structure comprises a folded template structure.

4. A structure according to claim 1, wherein the smartcard area comprises a ferromagnetic, magnetically permeable, or magnetically reflecting element.

5. A structure according to claim 4, wherein the element comprises a ferrite and/or Mu-metal material.

6. A structure according to claim 1, wherein the guide comprises an edge of the structure and/or one or more alignment marks, wherein the edge of the structure and/or one or more alignment marks are configured for aligning the structure with edge(s) of the smartphone.

7. A structure according to claim 1, wherein the structure is formed from a paper-based material.

8. A structure according to claim 1, comprising a first guide for a first phone model of phone or family of phones, and a second guide for a second model of phone or family of phones.

9. A structure according to claim 8, wherein the structure is configured to allow a selection of which of the first guide and the second guide is exposed for use by removing part of the structure.

10. A system for biometric enrolment of a biometrically-authorisable smartcard, the system comprising:
    the structure according to claim 1;
    the biometrically-authorisable smartcard; and
    the smartphone, wherein the smartcard does not comprise a power source.

11. A system as claimed in claim 10, wherein the smartcard has a size of approximately 86 by 54 millimetres, and wherein the smartcard comprises an antenna and is configured to communicate via a contactless communication protocol.

12. A system as claimed in claim 10, wherein the smartcard comprises a fingerprint sensor, enrolment of the smartcard being performed using the fingerprint sensor, and the smartcard is biometrically-authorisable with the fingerprint sensor.

13. A method of enrolling a biometric smartcard, the method comprising:
    placing the smartcard in the smartcard area of the structure according to claim 1;
    aligning the structure with respect to the smartphone using the guide; and
    supplying power from the smartphone to the smartcard via the near field communication antenna of the smartphone.

14. A method as claimed in claim 13, wherein the smartcard and structure are both placed above the smartphone or are both place below the smartphone.

15. A method as claimed in claim 13, comprising:
    instructing a user via on-screen instructions on the smartphone to adjust the alignment of the structure with respect to the smartphone.

16. A method as claimed in claim 15, comprising determining a signal strength of near-field communication between the smartphone and the smartcard and instructing the user to adjust the alignment based on the determined signal strength.

17. A method as claimed in claim 13, comprising:
    a user presenting a finger to a fingerprint sensor of the smartcard;
    capturing a fingerprint image using the fingerprint sensor of the smartcard;
    generating biometric reference data from the captured fingerprint image; and
    storing the reference data on the smartcard.

18. A method as claimed in claim 13, wherein the aligning of the structure with respect to the smartphone is performed by aligning an edge of the structure with an edge of the smartphone.

19. A method as claimed in claim 13, comprising:
    aligning the structure with respect to the smartphone;
    enrolling a first finger of a user on the smartcard;
    changing a orientation of the smartphone, the structure or the smartcard;
    re-aligning the structure with respect to the smartphone; and
    enrolling a second finger of the user on the smartcard.

20. A method comprising:
    identifying a smartphone to be used for providing power to a biometrically-authorisable smartcard during enrolment;
    identifying a position for the smartcard with respect to smartphone in which the smartcard is located proximate a near field communication antenna of the smartphone such that the smartcard receives power from the antenna,
    creating a design of a structure having a guide for aligning the structure with respect to the smartphone and a smartcard area for receiving the smartcard,
    wherein the smartcard area and guide are designed such that, when the smartcard is received by the smartcard area and the structure is aligned with respect to the smartphone in accordance with the guide, the smartcard is located in the identified position relative to the smartphone for a direct power transfer between the smartphone and the smartcard;

the structure being passive and re-alignable with respect to the smartphone; and the structure being disposable.

21. A method as claimed in claim 20, wherein the identifying of a position for the smartcard comprises identifying a position for substantially optimal near field communication between the smartcard and the smartphone.

22. A method according to claim 20, the method comprising:

manufacturing the structure having the guide and the smartcard area according to the design.

23. A method comprising:

identifying a model of the smartphone of a user;

selecting the structure for aligning a biometrically-authorisable smartcard with respect to the identified model of smartphone during biometric enrolment of the smartcard, the structure being a structure according to claim 1; and sending the selected structure to the user.

24. A method according to claim 23, comprising:

sending the structure to the user along with the biometrically-authorisable smartcard to be enrolled.

25. A method according to claim 23, comprising: receiving a request to send the biometrically-authorisable smartcard to the user, the request comprising an indication of the model of the smartphone in the possession of the user.

* * * * *